(12) United States Patent
Dennis et al.

(10) Patent No.: US 11,019,128 B2
(45) Date of Patent: *May 25, 2021

(54) IDENTITY SERVICE MANAGEMENT IN LIMITED CONNECTIVITY ENVIRONMENTS

(71) Applicant: International Business Machines Corporation, Armonk, NY (US)

(72) Inventors: Joseph M. Dennis, Tallahassee, FL (US); Girish B. Verma, Herndon, VA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/695,490

(22) Filed: Nov. 26, 2019

(65) Prior Publication Data
US 2020/0099736 A1  Mar. 26, 2020

Related U.S. Application Data

(63) Continuation of application No. 15/583,963, filed on May 1, 2017, now Pat. No. 10,530,833, which is a continuation of application No. 14/498,601, filed on Sep. 26, 2014, now Pat. No. 9,848,030, which is a continuation of application No. 14/109,734, filed on Dec. 17, 2013, now Pat. No. 9,531,784.

(51) Int. Cl.
*H04L 29/08* (2006.01)
*G06F 16/25* (2019.01)
(Continued)

(52) U.S. Cl.
CPC ............ *H04L 67/02* (2013.01); *G06F 16/254* (2019.01); *G06F 16/258* (2019.01);
(Continued)

(58) Field of Classification Search
CPC ......... H04L 67/02; H04L 29/08; H04L 12/24; H04L 67/16; H04L 41/50; H04L 67/1097;
(Continued)

(56) References Cited

U.S. PATENT DOCUMENTS 7,418,490 B1   8/2008  Zhang et al.
7,675,840 B1   3/2010  Prismantas et al.
(Continued)

OTHER PUBLICATIONS

Weisser, J.; Identity Management Within an Evolving Service-oriented Architecture; Diploma Thesis; Universität Karlsruhe; 2005 (http://pub.wei3er.com/dload/da_idm-in-soa.pdf).

*Primary Examiner* — Chirag R Patel
(74) *Attorney, Agent, or Firm* — James L. Baudino

(57) ABSTRACT

A technique for identity service management in a computing environment having a plurality of managed endpoints includes a mediator located within the computing environment and remote from an identity management service provider located external to the computing environment to enable management of the plurality of managed endpoints by the identity management service provider. The mediator includes a service manager configured to authenticate the mediator to the managed endpoints and configure the managed endpoints for pulling data from the managed endpoints. The mediator also includes a data exporter configured to export the data by the mediator to the identity management service provider in response to detecting a direct connection between the mediator and the identity management service provider.

20 Claims, 4 Drawing Sheets

(51) Int. Cl.
*H04L 29/06* (2006.01)
*H04L 12/24* (2006.01)

(52) U.S. Cl.
CPC ...... *H04L 41/5045* (2013.01); *H04L 41/5077* (2013.01); *H04L 63/10* (2013.01); *H04L 67/1097* (2013.01); *H04L 67/16* (2013.01); *H04L 67/325* (2013.01)

(58) Field of Classification Search
CPC ..... H04L 67/2842; H04L 63/10; G06F 16/95; G06F 16/254; G06F 16/25; G06F 16/258
See application file for complete search history.

(56) References Cited

U.S. PATENT DOCUMENTS

| | | |
|---|---|---|
| 7,865,606 B1 | 1/2011 | Tewes et al. |
| 8,261,330 B2 | 9/2012 | Atkins et al. |
| 8,266,327 B2 | 9/2012 | Kumar et al. |
| 8,281,010 B2 | 10/2012 | Ansari et al. |
| 8,296,178 B2 | 10/2012 | Hudis et al. |
| 8,370,901 B2 | 2/2013 | Huang et al. |
| 8,386,732 B1 | 2/2013 | Ninan et al. |
| 8,843,997 B1 | 9/2014 | Hare |
| 8,881,129 B1 | 11/2014 | McKinnon et al. |
| 9,141,442 B1 | 9/2015 | Voelcker et al. |
| 9,350,807 B2 | 5/2016 | Shah |
| 9,626,305 B1 | 4/2017 | Dutch et al. |
| 2003/0198188 A1 | 10/2003 | Castlebury et al. |
| 2004/0025052 A1 | 2/2004 | Dickenson |
| 2004/0123153 A1 | 6/2004 | Wright et al. |
| 2004/0177335 A1 | 9/2004 | Beisiegel et al. |
| 2007/0276804 A1 | 11/2007 | Khan et al. |
| 2007/0293210 A1 | 12/2007 | Strub et al. |
| 2008/0040790 A1 | 2/2008 | Kuo |
| 2009/0080708 A1 | 3/2009 | Mellen et al. |
| 2009/0204590 A1 | 8/2009 | Yaskin et al. |
| 2012/0023568 A1 | 1/2012 | Cha et al. |
| 2013/0024925 A1 | 1/2013 | Venkataramani et al. |
| 2014/0013409 A1 | 1/2014 | Halageri |
| 2014/0286482 A1 | 9/2014 | Minowa |

IDENTITY SERVICE MANAGEMENT IN LIMITED CONNECTIVITY ENVIRONMENTS

BACKGROUND

Identity management (IdM) systems manage users and their accounts across a number of managed systems, such as directories, databases, operating systems and enterprise applications. For example, IdM systems may manage the setup and monitoring of user accounts for accessing system resources and verify compliance with various security or other types of policies. The IdM system generally resides on the managed environment and obtains information from managed systems and schedules various tasks for the managed systems. These tasks may include the process of creating user accounts and permissions, the establishment and enforcement of authentication for newly created accounts, the process of changing/updating passwords or other security credentials, deleting or temporarily suspending/inactivating user accounts, and performing other account modifications/actions. The information acquired by the IdM system may also be used to verify compliance with security policies by managing and monitoring access to resources. IdM systems also utilize one or more adapters to interface with the various types of different managed system resources. The IdM system can generally communicate with the managed system resources via the adapter(s) to facilitate account management functionality.

BRIEF SUMMARY

According to one aspect of the present disclosure a system and technique for identity service management in a computing environment having a plurality of managed endpoints includes a mediator located within the computing environment and remote from an identity management service provider located external to the computing environment to enable management of the plurality of managed endpoints by the identity management service provider. The mediator includes a service manager configured to authenticate the mediator to the managed endpoints and configure the managed endpoints for pulling data from the managed endpoints. The mediator also includes a data exporter configured to export the data by the mediator to the identity management service provider in response to detecting a direct connection between the mediator and the identity management service provider.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
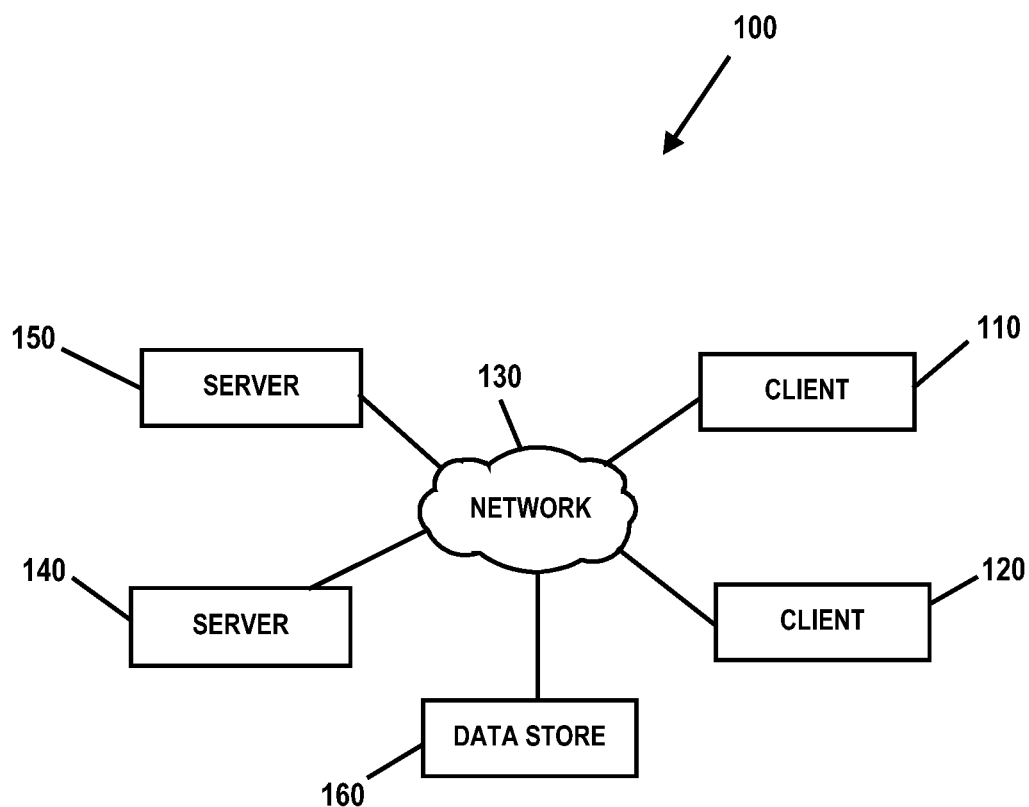
FIG. 1 is an embodiment of a network of data processing systems in which the illustrative embodiments of the present disclosure may be implemented.

Embodiments of the present disclosure provide a method, system and computer program product for identity service management in limited connectivity environments. For example, in some embodiments, the method and technique includes providing an adaptor mediator having access to a managed environment remote from the IdM service provider. The adapter mediator is configured with adapters needed to interface with the managed endpoints of the environment. Because of a lack of a direct connection or limited connectivity to the IdM service provider, the adapter mediator is configured to buffer information and perform various actions (e.g., account data retrieval and formatting) with the managed endpoints while no connection to the IdM service provider exists and interface/exchange information with the IdM service provider when a connection becomes available. In some embodiments, the adapters of the adapter mediator may be configured with read-only functionality enabled such that the adapter mediator provides IdM service functionality while limiting the ability to change/modify environment endpoints. Thus, embodiments of the present may include: providing a mediator between an identity management service provider and managed endpoints of a computing environment, the mediator comprising adapters for interfacing with the managed endpoints; extracting account data, by the mediator, from the managed endpoints; storing the extracted data, by the mediator, when a direct connection between the mediator and the identity management service provider is unavailable; and exporting the stored data to the identity management service provider in response to a direct connection between the mediator and the identity management service provider becoming available.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
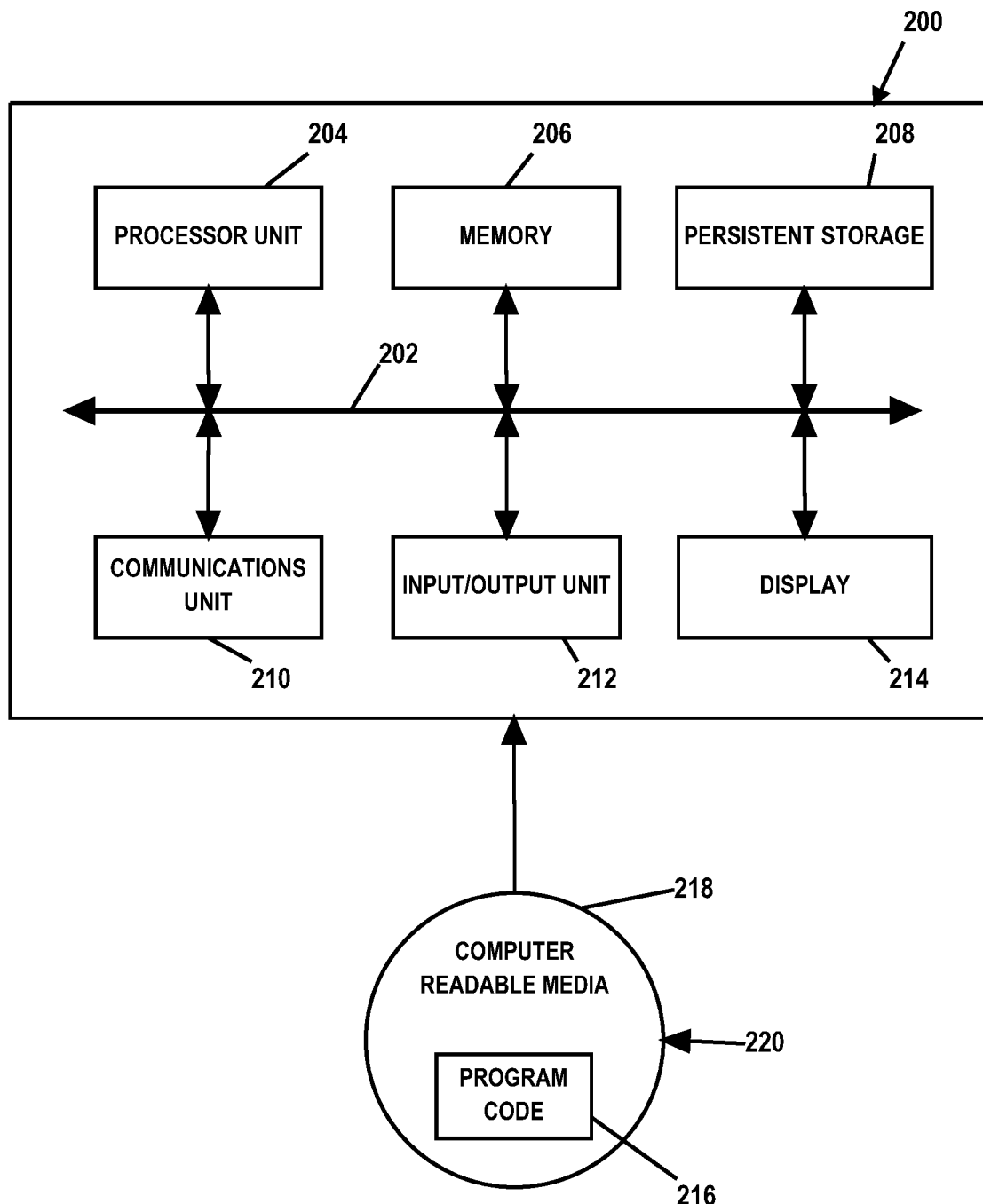
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for identity service management in limited connectivity environments according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
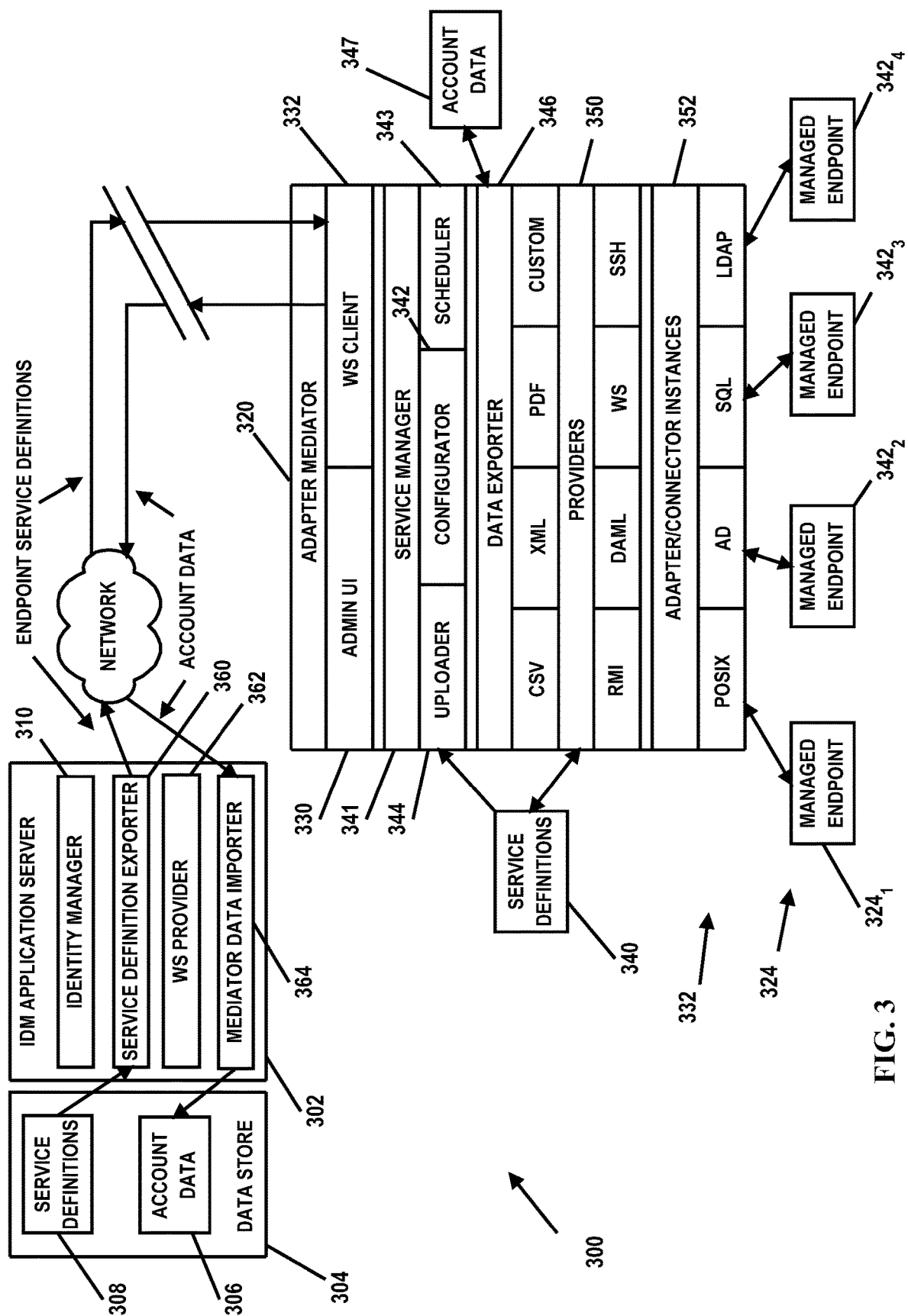
FIG. 3 is a diagram illustrating an embodiment of a computing environment in which illustrative embodiments of a system for identity service management in limited connectivity environments according to the present disclosure may be implemented.

FIG. 3 is a diagram illustrating a computing environment in which an embodiment of a system 300 for identity service management in limited connectivity environments according to the present disclosure may be implemented. In the illustrated embodiment, system 300 includes an identity management (IdM) server 302 for providing identity management services. IdM server 302 may have an associated IdM data store 304 containing account data 306 and policy or service definitions 308. Account data 306 may comprise information associated with user accounts created and managed by an identity manager 310 of server 302. Identity manager 310 may be implemented in any suitable manner using known techniques that may be hardware-based, software-based, or some combination of both. For example, identity manager 310 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). Identity manager 310 may be used for performing and/or initiating various actions related to user accounts and managed systems as well as implementing various user account provisioning policies. Service definitions 308 may comprise information associated with the topology of managed system resources as well as management information for the managed resource (e.g., the type of data to collect, how often to collect the data, types of security policies associated with the managed resource, etc.).

In the illustrated embodiment, system 300 also includes an adapter mediator 320. Adapter mediator 320 is configured to reside on an environment that has access to a managed computing environment 322 to facilitate management of resources of the computing environment 322 (e.g., remote from the identity management service provider (e.g., IdM server 302)). For example, in the illustrated embodiment, computing environment 322 includes a number of managed endpoints 324. Managed endpoints 324 may comprise any type of managed system such as, but not limited to, directories, databases, operating systems and applications. In the illustrated embodiment, four endpoints $324_{1-4}$ are illustrated; however, it should be understood that a greater or fewer quantity of endpoints 324 may be managed. Adapter mediator 320 may reside on computing environment 322 or may be located remote from computing environment 322.

In FIG. 3, adapter mediator 320 is configured to accommodate endpoint 324 management despite a direct connection barrier to IdM server 302. For example, in some embodiments, a network 326 that may be used to facilitate communications between IdM server 302 and adapter mediator 320 may provide only limited connectivity or limited windows of connectivity. Thus, account information and service definitions may not be able to be communicated on a regular real time or near real time basis between IdM server 302 and adapter mediator 320 at all (or most) times. In some embodiments, infrastructure limitations may prevent a direct, real time or near real time connection between IdM server 302 and adapter mediator 320 for a constant or substantially constant period of time. In some instances communications between IdM server 302 and adapter mediator 320 may be limited to manual data interchange. Adapter mediator 320 is configured to facilitate management of endpoints 324 despite the connectivity limitations between IdM server 302 and adapter mediator 320. Adapter mediator 320 may be implemented in any suitable manner using known techniques that may be hardware-based, software-based, or some combination of both. For example, adapter mediator 320 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the illustrated embodiment, adapter mediator 320 includes an administrator user interface (Admin UI) 330 and a web services (WS) client 332. Admin UI 330 may comprise an interface enabling an administrator or other user of environment 322 to locally and/or centrally control adapters and functions of adapter mediator 320. For example, interface 330 may enable an administrator or other user to define and/or download or import to mediator 320 service definitions 340 and to schedule/configure adapters of mediator 320. WS client 332 is configured having an architecture enabling communications with IdM server 302 using a web services protocol. For example, with a lack of a remote access protocol to identity manager server 310, WS client 332 enables data and command communications to be packaged similar to a web request to facilitate data transfer similar to hypertext transfer protocol (HTTP) packets, via WS provider 322.

A service manager 341 of mediator 320 is configured to store/maintain configuration information for endpoints 324 to keep track of the endpoints 324 defined in environment 322 and how to connect to and/or manage/configure endpoints 324. For example, in the illustrated embodiment, service manager 341 includes a configurator 342 operable to authenticate to endpoints 324 and configure endpoints 324 for requesting/pulling data from endpoints 324. For example, configurator 342 may be used to keep track of what endpoints 324 are being managed, authenticate to the endpoints 324 and use various configuration information to access/configure data communications therewith (e.g., authenticating to the endpoint 324, collecting data from endpoints 324 according to a desired schedule/grouping, transmitting management information to endpoints 324, etc.). A scheduler 343 of service manager 341 is configured to schedule management functions performed by mediator 320. For example, scheduler 343 may be used to schedule requests for data from endpoints 324 and schedule transfers of collected data to IdM server 302. An uploader 344 of mediator 320 is configured to transmit and/or communicate service data from mediator 320 to IdM server 302 (e.g., service definitions 340 to identity manager 310). Thus, in some embodiments, the administrator UI 330 may be used to set up service definitions 340 in mediator 320 and communicate the service definitions 340 to IdM server 302 (e.g., via uploader 344), or mediator 320 may be configured to import service definitions 308 from IdM server 302.

A data exporter 346 of mediator 320 is configured to manage data exportation to IdM server 302 (e.g., account and supporting data 347 retrieved from endpoints 324). For example, in some embodiments, data exporter may be configured to transform and/or otherwise format received data (e.g., from endpoints 324) to a desired format (e.g., CSV, XML, PDF or a custom data format) according to the needs/requirements of identity manager 310. In the illustrated embodiment, mediator 320 also includes one or more providers 350 that provide an interface between service manager 341 and one or more connector or adapter instances 352 of mediator 320. For example, in response to service manager 341 requesting and/or initiating a communication with a particular endpoint 324, providers 350 are configured to locate/identify a corresponding adapter 352 for communicating with the selected endpoint 324 and connect to the respective adapter 352 to facilitate the communications. In some embodiments, certain providers 350 may be configured to interface with particular adapters 352 according to certain protocols (e.g., remote method invocation (RMI), directory access markup language (DAML), web service (WS), secure shell (SSH) or other protocols). Certain adapters 352 may provide a certain type of interface to the corresponding endpoint 324 (e.g., a portable operating system interface (POSIX), active directory (AD) interface, structured query language (SQL), a lightweight directory access protocol LDAP) or other type of interface). For example, each adapter 352 provides an interface to a respective managed endpoint 324 such that one interface of adapter 352 enables communications with the respective endpoint 324 while another interface of the adapter 352 enables communication of data collected from the respective endpoint 324 in a desired format/language to mediator 320. Providers 350 provide an interface for a particular type of service based on corresponding endpoints 324 (e.g., whether the service is an active directory service, a database service, etc.).

In some embodiments, adapters 352 may be configured as and/or only have a read-only type of configuration enabled such that adapters 352 are operable to search/request data from endpoints 324 and send the collected data to IdM server 302 but are not configured to implement provisioning requests sent from IdM server 302 to mediator 320. For example, in some instances, the customer or user of environment 322 may prefer that actions that may directly affect and/or cause changes to environment 322 (e.g., endpoints 324) not be allowed. Thus, in this embodiment, adapters 352 are configured to provide only search/read functionality.

In the embodiment illustrated in FIG. 3, IdM server 302 also includes a service definition exporter 360, a web services provider 362 and a mediator data importer 364. Exporter 360 is configured to retrieve service definitions from data store 304 (e.g., service definitions 308) and transmit service definitions from IdM server 302 to mediator 320. Media data importer 364 is configured to request data (e.g., account data) from mediator 320 (e.g., according to service definitions 308) and upon receipt of the requested data store the account data in data store 304 and/or otherwise make available to identity manager 310. WS provider 362 is configured to interface with WS client 332 of mediator 320 to facilitate data exchange in a manner similar to HTTP packet communications (e.g., service definitions and/or account data). Service definition exporter 360, web services provider 362 and mediator data importer 364 may be implemented in any suitable manner using known techniques that may be hardware-based, software-based, or some combination of both. For example, service definition exporter 360, web services provider 362 and/or mediator data importer 364 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Thus, in operation, adapters 352, which may otherwise be located on IdM server 302, are located separate and remote from IdM server 302 on computing environment 322. Mediator 320 is configured to collect data from managed endpoints 324 and cache/store the collected data until such time that a network connection may be available to IdM server 302 (these functions may also be performed while a connection to IdM server 302 does exist). For example, mediator 320 may be configured to provide burst-type data transfer in response to a network 326 connection becoming available. In some embodiments, service manager 341 may be configured to monitor for a direct connection to IdM server 302 and interface/communicate with IdM server 302 when a direct connection is detected/established. Mediator 320 is configured to collect the data and translate/format the data according to desired formats/syntax to meet the needs/ requirements of identity manager 310 (e.g., via data exporter). Further, while a network connection is available, mediator 320 may receive service definitions and/or search requests for account data from identity manager 310 and perform the needed activities requested by identity manager 310, such as interfacing with managed endpoints 324 to collect data. Mediator 320 may continue to perform the requested actions after a network connection is unavailable (e.g., communicating the requested data to identity manager 310 upon the network connection next becoming available or via some other means (e.g., as data files in a format acceptable to identity manager via another route, such as a manual e-mail communication)). The collected account or other data may be batched and stored by adapter mediator 320 (e.g., corresponding to a particular endpoint 324 or multiple endpoints 324) and then exported to IdM server 302 when a connection to IdM server 302 becomes available or by other means (e.g., packaging as an e-mail attachment for transmission to IdM server 302 via an administrator electronic mail message). Communications between mediator 320 and IdM server 302 may be made by web service protocols or other types of modes that present minimal security risks to environment 322 (e.g., between WS provider 362 and WS client 332).

Figure 4:
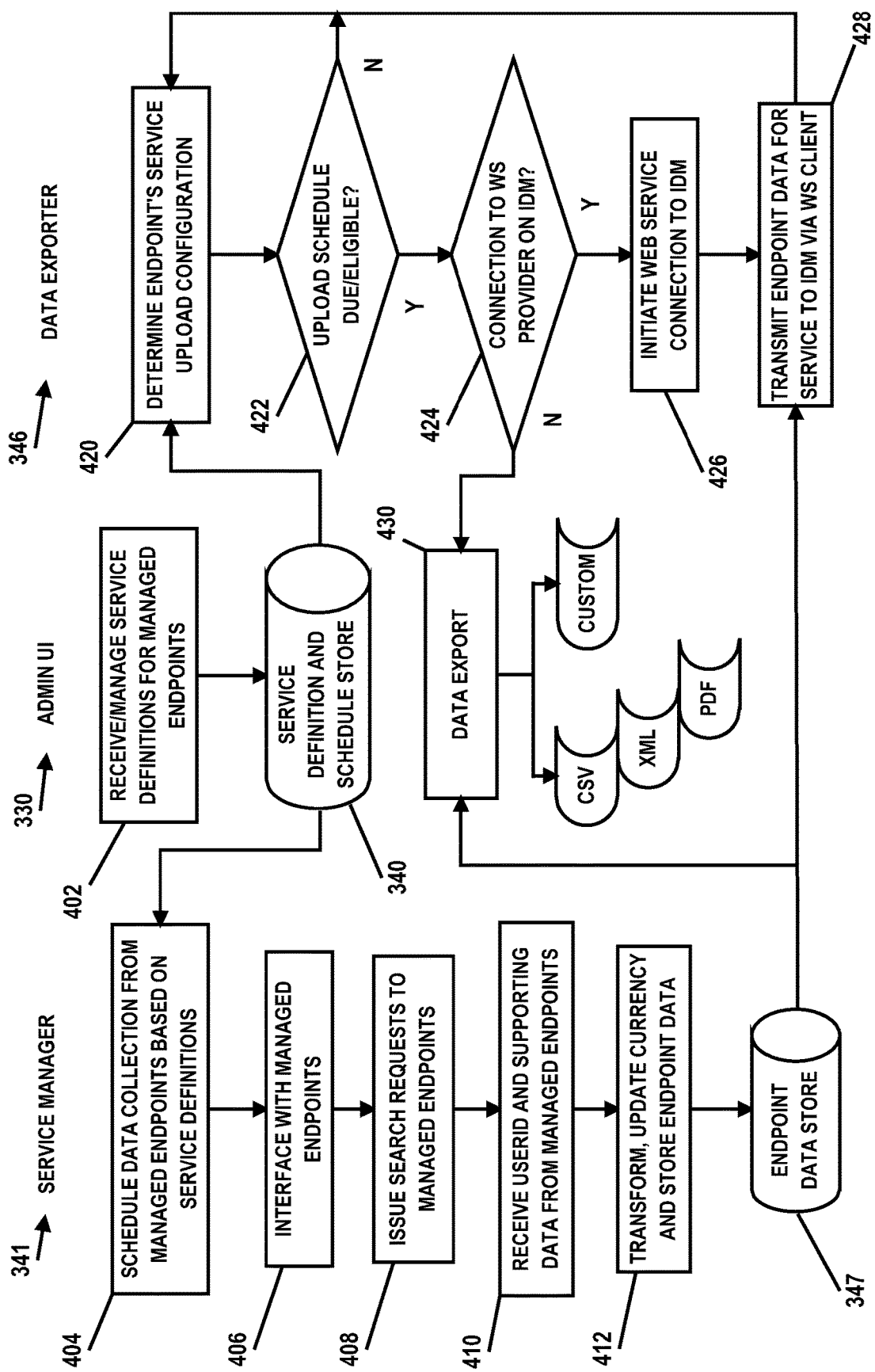
FIG. 4 is a flow diagram illustrating an embodiment of a method for identity service management in limited connectivity environments according to the present disclosure.

FIG. 4 is a flow diagram illustrating an embodiment of a method for identity service management in limited connectivity environments according to the present disclosure. The method begins at block 402, where adapter mediator 320 receives service definitions for managed endpoints 324. As indicated above, the service definitions may be loaded into adapter mediator 320 via administrator UI 330 or imported from IdM server 302 when a connection is available or imported using a predetermined file interchange format.

Blocks 404 through block 412 are part of a cyclical process that executes (or is "awoke") when it is triggered by a service's schedule of retrieving data from the managed endpoint. At block 404, adapter mediator 320 (e.g., via service manager 341) schedules data collection from managed endpoints 324 based on received service definitions. At block 406, adapter mediator 320 interfaces with managed endpoints 324 (e.g., authenticates to endpoints 324). At block 408, adapter mediator 320 issues search requests to managed endpoints 324.

At block 410, adapter mediator 320 collects data from managed endpoints 324 (e.g., user identification (UserID) and/or supporting data). At block 412, adapter mediator 320 transforms and/or otherwise updates the currency of the collected data to desired format(s) and stages/stores the data into a data store (e.g., data store 347).

Blocks 420 through block 426 are part of a cyclical process that executes (or is "awoke") when it is triggered by a connection to the IdM service provider (e.g., IdM server 302) being available and optionally by a schedule of exporting endpoint data to the IdM service provider (e.g., via data exporter 346). The process may iterate through services which have data available in data store 347. At block 420, a configuration of an endpoint's service upload configuration may be determined. At decisional block 422, a determination is made whether the service data is eligible to upload. Service data may be scheduled for upload based on anticipated connection windows or may be specified to be uploaded as soon as it is available. If the service data is not eligible for upload, the method may proceed to block 420. If the service data is eligible to upload, the method proceeds from decisional block 422 to decisional block 424, where data exporter 346 assesses whether a connection to IdM server 302 is available. If no direct connection is available, the method may proceed to block 430, where an administrator or other authorized user can export the data in a preferred format via manual or email transmission to the IdM service provider (e.g., IdM server 302). If a connection to IdM server 302 does exist, the method proceeds to block 426, where adapter mediator 320 initiates a web services connection to IdM server 302 in preparation for packaging and transmission of endpoint data. At block 428, adapter mediator 320 transmits the batched collected data to IdM server 302.

In FIG. 4, the cyclical blocks 404 thru block 412 represent a work stream that is executed by adapter mediator 320 on an ongoing basis and it extracts data from multiple endpoints 342. The cyclical blocks 422 thru 428 represent a second work stream that is executed by adapter mediator 320 on an ongoing basis that exports data to the IdM service provider.

Thus, embodiments of the present disclosure provide an adaptor mediator having access to a managed environment and remote from the IdM service provider. The adapter mediator is configured with adapters needed to interface with the managed endpoints of the environment. Because of a lack of a direct connection or limited connectivity to the IdM service provider, the adapter mediator is configured to buffer information and perform various actions (e.g., account data retrieval and formatting) with the managed endpoints while no connection to the IdM service provider exists and interface/exchange information with the IdM service provider when a connection becomes available. In some embodiments, the adapters of the adapter mediator may be configured with read-only functionality enabled such that the adapter mediator provides IdM service functionality while limiting the ability to change/modify environment endpoints. The status and stored data may be exported to the identity management service provider in response to a direct burst, timed or normal connection between the mediator and the identity management service provider becoming available, or as data files in a format acceptable to identity manager.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
    a computing environment comprising a plurality of managed endpoints; and
    a mediator located within the computing environment and remote from an identity management service provider located external to the computing environment, the mediator configured to interface with the plurality of managed endpoints to enable management of the plurality of managed endpoints by the identity management service provider, the mediator comprising:
        a service manager configured to authenticate the mediator to the managed endpoints and configure the managed endpoints for pulling data from the managed endpoints; and
        a data exporter configured to export the data by the mediator to the identity management service provider in response to detecting a direct connection between the mediator and the identity management service provider.

2. The system of claim 1, wherein the mediator is configured to communicate with the identity management service provider via a limited connectivity network and receive search requests from the identity management service provider when the direct connection is detected.

3. The system of claim 1, wherein the mediator is configured to import service definitions associated with the managed endpoints from the identity management service provider when the direct connection to the identity management service provider is detected.

4. The system of claim 2, wherein the mediator is configured to issue search requests to the managed endpoints based on the search requests received from the identity management service provider after the direct connection to the identity management service provider becomes unavailable.

5. The system of claim 1, wherein the mediator comprises a user interface configured to receive input of service definitions for the managed endpoints.

6. The system of claim 1, wherein the mediator is configured to store the data when the direct connection to the identity management service provider is unavailable.

7. The system of claim 1, wherein the service manager is configured to:
    schedule retrievals of the data from the managed endpoints;
    store batches of the data corresponding to multiple managed endpoints; and
    export the batched data to the identity management service provider in response to detecting the direct connection.

8. A computer program product for identity service management of a computing environment having a plurality of managed endpoints, the computer program product comprising:
    a non-transitory computer readable medium having computer readable program code embodied therewith, the computer readable program code comprising computer readable program code configured to:
        authenticate a mediator located within a computing environment with a plurality of managed endpoints located within the computing environment to enable management of the plurality of managed endpoints by an identity management service provider, the identity management service provider located external to the computing environment;
        configure the managed endpoints for pulling data from the managed endpoints by the mediator; and
        export the data by the mediator to the identity management service provider in response to detecting a direct connection between the mediator and the identity management service provider.

9. The computer program product of claim 8, wherein the computer readable program code is configured to cause the mediator to communicate with the identity management service provider via a limited connectivity network and receive search requests from the identity management service provider when the direct connection is detected.

10. The computer program product of claim 8, wherein the computer readable program code is configured to cause the mediator to import service definitions associated with the managed endpoints from the identity management service provider when the direct connection to the identity management service provider is detected.

11. The computer program product of claim 9, wherein the computer readable program code is configured to issue search requests to the managed endpoints based on the search requests received from the identity management service provider after the direct connection to the identity management service provider becomes unavailable.

12. The computer program product of claim 8, wherein the computer readable program code is configured to store the data by the mediator when the direct connection to the identity management service provider is unavailable.

13. The computer program product of claim 8, wherein the computer readable program code is configured to:
  schedule retrievals of the data from the managed endpoints;
  store batches of the data corresponding to multiple managed endpoints; and
  export the batched data to the identity management service provider in response to detecting the direct connection.

14. The computer program product of claim 8, wherein the computer readable program code is configured to receive, via a user interface of the mediator, input of service definitions for the managed endpoints.

15. A method, comprising:
  configuring a mediator located within a computing environment to authenticate the mediator with a plurality of managed endpoints located within the computing environment to enable management of the plurality of managed endpoints by an identity management service provider, the identity management service provider located external to the computing environment;
  configuring, by the mediator, the managed endpoints for pulling data from the managed endpoints by the mediator; and
  exporting the data by the mediator to the identity management service provider in response to detecting a direct connection between the mediator and the identity management service provider.

16. The method of claim 15, further comprising importing service definitions associated with the managed endpoints from the identity management service provider when the direct connection to the identity management service provider is detected.

17. The method of claim 15, further comprising issuing, by the mediator, search requests to the managed endpoints based on search requests received by the mediator from the identity management service provider after the direct connection to the identity management service provider becomes unavailable.

18. The method of claim 15, further comprising storing the data by the mediator when the direct connection to the identity management service provider is unavailable.

19. The method of claim 15, further comprising:
  scheduling retrievals of the data from the managed endpoints;
  storing batches of the data corresponding to multiple managed endpoints; and
  exporting the batched data to the identity management service provider in response to detecting the direct connection.

20. The method of claim 15, further comprising receiving, via a user interface of the mediator, input of service definitions for the managed endpoints.

* * * * *